3,253,062
PHOSPHONAMIDIC ACIDS AND ESTERS

Theodor Reetz, Webster Groves, and William D. Dixon, Kirkwood, Mo., assignors to Monsanto Company, a corporation of Delaware
No Drawing. Filed Aug. 9, 1962, Ser. No. 215,786
7 Claims. (Cl. 260—956)

This invention relates to a novel class of amine-containing organo phosphorus compounds. More particularly, this invention is concerned with a novel class of compounds which may be characterized as substituted N,N-bis(2-chloroethyl)-P-(methyl or chloromethyl) phosphonamidic acids and esters.

The organo phosphorus compounds of this invention may be illustrated by the formula,

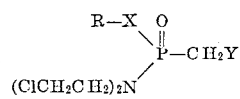

wherein X is selected from the group consisting of oxygen and sulfur, Y is selected from the group consisting of chlorine and hydrogen, and R is selected from the group consisting of hydrogen, alkyl of one to four carbon atoms, mono-, di and trichloroalkyl of one to four carbon atoms, allyl, mono- and dichloroallyl, propynyl, phenyl, monochlorophenyl, mononitrophenyl, monocyanophenyl, tolyl, and tetrahydrofurfuryl. As illustrative of the radicals represented by R in the above formula are the following: methyl, ethyl, n-propyl, isopropyl, n-butyl, isobutyl, sec.-butyl, t-butyl, chloromethyl, 2-chloroethyl, 2,2,2-trichloroethyl, 2-chloropropyl, 3-chloropropyl, 2,3-dichloropyl, 2-chlorobutyl, 2,3-dichlorobutyl, 2-chloroallyl, 3-chloroallyl, 3,3-dichloroallyl, o-chlorophenyl, m-chlorophenyl, o-nitrophenyl, p-cyanophenyl, o-tolyl, and p-tolyl.

It has been found that the novel compounds of this invention can be prepared by reacting a phosphonamidic halide with water or an alcohol or mercaptan in accordance with the following equation:

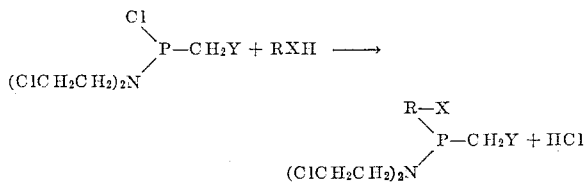

Specifically, the halide employed is N,N-bis(2-chloroethyl)-P-(methyl)chloride or the corresponding chloromethyl compound. The preparation of these starting materials is fully described in copending application, Serial No. 121,324, filed July 3, 1961, now abandoned.

In preparing the compounds of this invention, it is preferred to employ a tertiary amine along with the starting halide and the alcohol or mercaptan. Said amine serves as an acceptor for the hydrogen halide which is a by-product of the reaction. The nature of such amines is well known to those skilled in the art. Illustrative examples of suitable amines include trimethylamine, triethylamine, tri-n-butylamine, dimethylaniline, 2-picoline, pyridine, quinoline, and the like.

It is also preferred to carry out the above-described reaction in the presence of a solvent which is inert under the reaction conditions. Exemplary inert solvents include benzene, toluene, xylene, the chlorinated derivatives thereof, acetonitrile, tetrahydrofuran, and ethers such as diethylether. The reaction is generally carried out at room temperatures, although higher or lower temperatures may be found to be desirable when employing specific individual alcohols or mercaptans. The reaction mixture should be continually stirred during the reaction period. The duration of said period is subject to wide variation and will be primarily dependent upon the particular starting materials which are employed. The reaction period should be of a duration such that all of the amine hydrochloride which forms will precipiate.

The invention will be more fully understood by reference to the following exemplary preparations of specific representative compounds. These examples, however, are presented for the purposes of illustration only, and are not to be construed as limiting the scope of the present invention in any way.

Example I

A suitable reaction vessel is charged with a solution of 40.9 grams (0.15 mol) of N,N-bis(2-chloroethyl)-P-(chloromethyl)phosphonamidic chloride in 350 ml. of ether. Said solution is then stirred during the addition of 15.1 grams (0.15 mol) of triethylamine and 2.7 ml. of water. The temperature of the reaction mixture is maintained at 23–28° C., and the stirring is continued until all of the amine hydrochloride which forms has precipitated. Said amine hydrochloride is then removed by filtration. To the ether filtrate, there is added 27.2 grams (0.15 mol) of dicyclohexylamine. Upon standing, a crystalline solid is formed. This material is recrystallized from a benzene-hexane mixture. There are obtained 41.0 grams of N,N-bis(2-chloroethyl)-P-(chloromethyl)phosphonamidic acid, dicyclohexyl ammonium salt as a white solid. Analysis shows 24.6% chlorine and 6.5% nitrogen as against calculated values of 24.4% and 6.45%, respectively, for $C_{17}H_{34}Cl_3N_2O_2P$.

Example II

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 7.8 grams (0.1 mol) of benzene in 50 ml. of ether. The temperature of the reaction mixture is then maintained at 23–28° C., and the stirring is continued until all of the amine hydrochloride which forms has precipitated. Said amine hydrochloride is removed by filtration, after which the ether is evaporated. The residue is distilled in two portions, and the distillates are combined. There are obtained 12.9 grams of phenyl N,N-bis(2-chloroethyl)-P-chloromethyl)phosphonamidate as a colorless liquid, B.P. 149° C. at 0.01 mm. Hg. Analysis shows 31.9% chlorine and 4.14% nitrogen as against calculated values of 32.18% and 4.24%, respectively, for $C_{11}H_{15}Cl_3NO_2P$.

Example III

A suitable reaction vessel is charged with a solution of 23.8 grams (0.1 mol) of N,N-bis(2-chloroethyl)-P-(methyl)phosphonamidic chloride in 150 ml. of ether. Said solution is then stirred during the addition of a solution of 10.1 grams (0.1 mol) of triethylamine and 3.2 grams (0.1 mol) of methanol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is purified by chromatography on a 22 x 400 mm. column of Fisher absorption alumina by elution with benzene. There are obtained 14.1 grams of methyl N,N-bis(2-chloroethyl)-P-(methyl)phosphonamidate as a light yellow liquid. Analysis shows 29.7% chlorine and 12.9% phosphorus as against calculated values of 30.3% and 12.9%, respectively, for $C_6H_{14}Cl_2NO_2P$.

Example IV

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 3.2 grams (0.1 mol) of methanol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is purified by chromatography on a 22 x 400 mm. column of Fisher absorption alumina by elution with benzene. There are obtained 9.5 grams of methyl N,N-bis(2-chloroethyl)-P-(chloromethyl)phosphonamidate as a light yellow liquid. Analysis shows 39.9% chlorine and 5.1% phosphorus as against calculated values of 39.6% and 5.2% respectively, for $C_6H_{13}Cl_3NO_2P$.

Example V

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 8.05 grams (0.1 mol) of ethylene chlorohydrin in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is purified by chromatography on a 22 x 400 mm. column of Fisher absorption alumina by elution with benzene. There are obtained 16.4 grams of 2-chloroethyl N,N-bis(2-chloroethyl) - P - (chloromethyl)phosphonamidate as a colorless liquid. Analysis shows 44.7% chlorine and 9.5% phosphorus as against calculated values of 44.7% and 9.7%, respectively, for $C_7H_{14}Cl_4NO_2P$.

Example VI

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 4.6 grams (0.1 mol) of ethanol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is purified by chromatography on a 22 x 400 mm. column of Fisher absorption alumina by elution with benzene. There are obtained 10.1 grams of ethyl N,N-bis(2-chloroethyl)-P-(chloromethyl)phosphonamidate as a colorless liquid. Analysis shows 37.4% chlorine and 10.8% phosphorus as against calculated values of 37.6% and 10.9%, respectively, for $C_7H_{15}Cl_3NO_2P$.

Example VII

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 9.3 grams (0.1 mol) of 2-chloroallyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is purified by chromatography on a 22 x 400 mm. column of Fisher absorption alumina by elution with benzene. There are obtained 17.6 grams of 2-chloroallyl N,N-bis(2-chloroethyl) - P - (chloromethyl)-phosphonamidate as a light yellow liquid. Analysis shows 43.3)% chlorine and 9.2% phosphorus as against calculated values of 43.1% and 9.4%, respectively, for $$C_8H_{14}Cl_4NO_2P$$

Example VIII

A suitable reaction vessel is charged with a solution of 23.8 grams (0.1 mol) of N,N-bis(2-chloroethyl)-P-(methyl)phosphonamidic chloride in 150 ml. of ether. Said solution is then stirred during the addition of a solution of 10.1 grams (0.1 mol) of triethylamine and 8.05 grams (0.1 mol) of ethylene chlorohydrin in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is purified by chromatography on a 22 x 400 mm. column of Fisher absorption alumina by elution with benzene. There are obtained 15.4 grams of 2-chloroethyl N,N-bis(2-chloroethyl)-P-(methyl)phosphonamidate as a light yellow liquid. Analysis shows 37.7% chlorine and 10.7% phosphorus as against calculated values of 37.7% and 11.0%, respectively, for $C_7H_{15}Cl_3NO_2P$.

Example IX

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 10.2 grams (0.1 mol) of tetrahydrofurfuryl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is purified by chromatography on a 22 x 400 mm. column of Fisher absorption alumina by elution with benzene. There are obtained 15.7 grams of 2-tetrahydrofurfuryl N,N-bis(2-chloroethyl)-P-chloromethyl)phosphonamidate as a viscous tan liquid. Analysis shows 30.8% chlorine and 8.9% phosphorus as against calculated values of 31.4% and 9.2%, respectively, for $C_{10}H_{19}Cl_3NO_3P$.

Example X

A suitable reaction vessel is charged with a solution of 23.8 grams (0.1 mol) of N,N-bis(2-chloroethyl)-P-(methyl)phosphonamidic chloride in 150 ml. of ether. Said solution is then stirred during the addition of a solution of 10.1 grams (0.1 mol) of triethylamine and 10.1 grams (0.1 mol) of ethanol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is purified by chromatography on a 22 x 400 mm. column of Fischer absorption alumina by elution with benzene. There are obtained 10.1 grams of ethyl N,N-bis(2-chloroethyl)-P-methyl)phosphonamidate as a clear liquid. Analysis shows 28.6% chlorine and 12.5% phosphorus as against calculated values of 28.58% and 12.49%, respectively, for $C_7H_{16}Cl_2NO_2P$.

Example XI

A suitable reaction vessel is charged with a solution of 35.8 grams (0.15 mol) of N,N-bis(2-chloroethyl)-P-(methyl)phosphonamidic chloride in 150 ml. of tetrahydrofuran. Said solution is then stirred during the addition of a solution of 15.2 grams (0.15 mol) of triethylamine and 13.8 grams (0.15 mol) of 2-chloroallyl alcohol in 100 ml. of tetrahydrofuran. The temperature of the reaction mixture is maintained at 25–30° C., and the stirring is continued until all of the amine hydrochloride which forms has precipitated. Said amine hydrochloride is then removed by filtration, after which the tetrahydrofuran is evaporated. The residue is purified by chromatography on a 22 x 400 mm. column of Fisher absorption alumina by elution with benzene. There are obtained 16.8 grams of 2-chloroallyl N,N-bis(2-chloroethyl)-P-(methyl)phosphonamidate as a light yellow liquid. Analysis shows 36.1% chlorine and 10.3% phosphorus as against calculated values of 36.2% and 10.5%, respectively, for $C_8H_{15}Cl_3NO_2P$.

*Example XII*

A suitable reaction vessel is charged with a solution of 27.3 grams (0.1 mol) of N,N-bis,2-(chloroethyl)-P-(chloromethyl)phosphonamidic chloride in 150 ml. of ether. Said solution is then stirred during the addition of a solution of 10.1 grams (0.1 mol) of triethylamine and 7.6 grams (0.1 mol) of 1-propanethiol in 50 ml. of ether. The temperature of the reaction mixture is maintained at 23-28° C., and the stirring is continued until all of the amine hydrochloride which forms has precipitated. Said amine hydrochloride is then removed by filtration, after which the ether is evaporated. The residue is purified by chromatography on a 22 x 400 mm. column of Fisher absorption alumina by elution with benzene. There are obtained 16.1 grams of S-propyl N,N-bis(2-chloroethyl)-P-(chloromethyl)phosphonamidothiolate as a clear liquid. Analysis shows 33.9% chlorine and 9.7% phosphorus as against calculated values of 34.0% and 9.9%, respectively, for $C_8H_{17}Cl_3NOPS$.

*Example XIII*

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 12.4 grams (0.1 mol) of p-toluenethiol in 50 ml. of ether. The temperature of the reaction mixture is maintained at 20-25° C., and the stirring is continued until all of the amine hydrochloride which forms has precipitated. Said amine hydrochloride is then removed by filtration, after which the ether is evaporated. The residue solidifies on standing and is crystallized from an ethyl acetate-hexane mixture. There are obtained 26.1 grams of S-(p-tolyl)-N,N-bis(2-chloroethyl)-P-(chloromethyl) phosphonamidothiolate as a white crystalline solid, M.P. 79-80° C. Analysis shows 29.6% chlorine and 8.4% phosphorus as against calculated values of 29.5% and 8.6%, respectively, for $C_{12}H_{17}Cl_3NOPS$.

*Example XIV*

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine in 50 ml. of ether. There is then added 14.4 grams (0.1 mol) of p-chlorobenzenethiol. The temperature of the reaction mixture is maintained at 20-25° C., and the stirring is continued until all of the amine hydrochloride which forms has precipitated. A solid forms and is removed by filtration and dried. The solid is then dissolved in alcohol, and water is added until precipitation is complete. Said solid is recrystallized several times from an alcohol-water mixture. There are obtained 28.2 grams of S-(p-chlorophenyl)-N,N-bis(2-chloroethyl)-P-(chloromethyl)phosphonamidothiolate, M.P. 95-96° C. Analysis shows 37.3% chlorine and 3.6% nitrogen as against calculated values of 37.2% and 3.7%, respectively, for $C_{11}H_{14}Cl_4NOPS$.

*Example XV*

A suitable reaction vessel is charged with a solution of 23.8 grams (0.1 mol) of N,N-bis(2-chloroethyl)-P-(methyl)phosphonamidic chloride in 150 ml. of tetrahydrofuran. Said solution is then stirred during the addition of a solution of 10.1 grams (0.1 mol) of triethylamine and 11.0 grams (0.1 mol) of benzenethiol in 50 ml. of tetrahydrofuran. The temperature of the reaction mixture is maintained at 25-28° C., and the stirring is continued until all of the amine hydrochloride which forms has precipitated. Said amine hydrochloride is then removed by filtration, after which the tetrahydrofuran is evaporated. The residue is purified by chromatography on a 22 x 400 mm. column of Fisher absorption alumina by elution with benzene. There are obtained 15.2 grams of S-phenyl N,N-bis(2-chloroethyl)-P-(methyl)phosphonamidothiolate as a light yellow liquid. Analysis shows 22.3% chlorine and 9.7% phosphorus as against calculated values of 22.7% and 9.9%, respectively, for $C_{11}H_{16}Cl_2NOPS$.

*Example XVI*

A suitable reaction vessel is charged with a solution of 23.8 grams (0.1 mol) of N,N-bis(2-chloroethyl)-P-(methyl)phosphonamidic chloride in 150 ml. of tetrahydrofuran. Said solution is then stirred during the addition of a solution of 10.1 grams (0.1 mol) of triethylamine in 50 ml. of tetrahydrofuran. There is then added 14.4 grams (0.1 mol) of p-chlorobenzenethiol. The temperature of the reaction mixture is maintained at 25-30° C., and the stirring is continued until all of the amine hydrochloride which forms has precipitated. Said amine hydrochloride is then removed by filtration, after which the tetrahydrofuran is avaporated. The residue solidifies on standing and is extracted several times with boiling hexane. The hexane extracts are then combined and cooled. There are obtained 24.8 grams of S-(p-chlorophenyl) N,N-bis-(2-chloroethyl)-P-(methyl)phosphonamidothiolate as a white crystalline solid, M.P. 77-78° C. Analysis shows 31.0% chlorine and 3.9% nitrogen as against calculated values of 30.7% and 4.0, respectively, for $C_{11}H_{15}Cl_3NOPS$.

*Example XVII*

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 12.4 grams (0.1 mol) of o-toluenethiol in 50 ml. of ether. The temperature of the reaction mixture is maintained at 25-30° C., and the stirring is continued until all of the amine hydrochloride which forms has precipitated. Said amine hydrochloride is then removed by filtration, after which the ether is evaporated. The residue solidifies on standing and is crystallized from alcohol. There are obtained 21.4 grams of S-(o-tolyl) N,N-bis(2-chloroethyl) - P - (chloromethyl)phosphonamidothiolate as a white crystalline solid, M.P. 77-78° C. Analysis shows 29.8% chlorine and 3.8% nitrogen as against calculated values of 29.5% and 3.9%, respectively, for $C_{12}H_{17}Cl_3NOPS$

*Example XVIII*

A suitable reaction vessel is charged with a solution of 23.8 grams (0.1 mol) of N,N-bis(2-chlorethyl)-P-(methyl)phosphonamidic chloride in 150 ml. of tetrahydrofuran. Said solution is then stirred during the addition of a solution of 10.1 grams (0.1 mol) of triethylamine and 12.4 grams (0.1 mol) of p-toluenethiol in 50 ml. of tetrahydrofuran. The temperature of the reaction mixture is maintained at 25-30° C., and the stirring is continued until all of the amine hydrochloride which forms has precipitated. Said amine hydrochloride is then removed by filtration, after which the tetrahydrofuran is evaporated. The residue solidifies on standing and is extracted several times with boiling pentane. The pentane extracts are then combined and cooled. There are obtained 6.4 grams of S-(p-tolyl) N,N-bis(2-chloroethyl)-P-(methyl)phosphonamidothiolate as a white crystalline solid, M.P. 54–55° C. Analysis shows 21.4% chlorine and 9.4% phosphorus as against calculated values of 21.7% and 9.5%, respectively, for $C_{12}H_{18}Cl_2NOPS$.

Example XIX

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 13.9 grams (0.1 mol) of p-nitrophenol in 50 ml. of ether. The temperature of the reaction mixture is maintained at 20–23° C., and the stirring is continued until all of the amine hydrochloride which forms has precipitated. The precipitate is then removed by filtration, after which it is recrystallized from methanol. The filtrate is evaporated, and the residue is crystallized from methanol. The two crystallized portions are combined and recrystallized from methanol. There are obtained 23.4 grams of p-nitrophenyl N,N-bis(2-chloroethyl)-P-(chloromethyl) phosphonamidate as a white solid, M.P. 95–96° C. Analysis shows 28.4% chlorine and 8.1% phosphorus as against calculated values of 28.4% and 8.3%, respectively, for $C_{11}H_{14}Cl_3N_2O_4P$.

Example XX

A suitable reaction vessel is charged with a solution of 6.9 grams (0.025 mol) of N,N-bis(2-chloroethyl)-P-(chloromethyl)phosphonamidic chloride in 250 ml. of ether. Said solution is then stirred during the addition of 2.5 grams (0.025 mol) of triethylamine and 0.45 ml. of water. The temperature of the reaction mixture is maintained at 23–28° C., and the stirring is continued until all of the amine hydrochloride which forms has precipitated. Said amine hydrochloride is then removed by filtration. To the ether filtrate, there is added 1.8 grams (0.025 mol) of t-butylamine. Upon standing, a crystalline solid is formed. This material is recrystallized from an acetone-alcohol mixture. There are obtained 4.8 grams of N,N-bis(2-chloroethyl)-P-(chloromethyl)phosphonamidic acid, t-butyl ammonium salt as a white solid, M.P. 130–131° C. Analysis shows 32.7% chlorine and 8.4% nitrogen as against calculated values of 32.5% and 8.6%, respectively, for $C_9H_{22}Cl_3N_2O_2P$.

Example XXI

A suitable reaction vessel is charged with a solution of 23.8 grams (0.1 mol) of N,N-bis(2-chloroethyl)-P-(methyl)phosphonamidic chloride in 150 ml. of tetrahydrofuran. Said solution is then stirred during the addition of a solution of 10.1 grams (0.1 mol) of triethylamine and 13.9 grams (0.1 mol) of p-nitrophenol in 50 ml. of tetrahydrofuran. The temperature of the reaction mixture is maintained at 43–45° C., and the stirring is continued until all of the amine hydrochloride which forms has precipitated. Said amine hydrochloride is then removed by filtration, after which the tetrahydrofuran is evaporated. The residue is subjected to a vacuum of 0.1 mm. at 50° C. and is then purified by chromatography on a 22 x 400 mm. column of Fisher absorption alumina by elution with benzene. The crystalline product is recrystallized several times from a benzene-ether mixture. There are obtained 4.5 grams of p-nitrophenyl N,N-bis(2-chloroethyl)-P-(methyl)phosphonamidate as a white solid, M.P. 62–63° C. Analysis shows 21.1% chlorine and 8.9% phosphorus as against calculated values of 20.8% and 9.1%, respectively, for $C_{11}H_{15}Cl_2N_2O_4P$.

Example XXII

A suitable reaction vessel is charged with a solution of 27.3 grams (0.1 mol) of N,N-bis(2-chloroethyl)-P-(chloromethyl)phosphonamidic chloride in 150 ml. of tetrahydrofuran. Said solution is then stirred during the addition of a solution of 10.1 grams (0.1 mol) of triethylamine and 11.9 grams (0.1 mol) of p-cyanophenol in 50 ml. of tetrahydrofuran. The temperature of the reaction mixture is maintained at 58–60° C. during the addition, and the stirring is then continued at room temperature until all of the amine hydrochloride which forms has precipitated. Said amine hydrochloride is then removed by filtration, after which the tetrahydrofuran is evaporated. The residue is crystallized from a tetrahydrofuran-ether mixture, cooled in an acetone-Dry Ice bath. After several recrystallizations, there are obtained 4.1 grams of p-cyanophenyl N,N-bis(2-chloroethyl)-P-(chloromethyl)phosphonamidate as a white solid, M.P. 63–64° C. Analysis shows 29.9% chlorine and 8.7% phosphorus as against calculated values of 30.0% and 8.7%, respectively, for $C_{12}H_{14}Cl_3N_2O_2P$.

Example XXIII

A suitable reaction vessel is charged with a solution of 23.8 grams (0.1 mol) of N,N-bis(2-chloroethyl)-P-(methyl)phosphonamidic chloride in 150 ml. of tetrahydrofuran. Said solution is then stirred during the addition of a solution of 10.1 grams (0.1 mol) of triethylamine and 12.7 grams (0.1 mol) of 3,3-dichloroallyl alcohol in 50 ml. of tetrahydrofuran. The temperature of the reaction mixture is maintained at 25–30° C., and the stirring is continued until all of the amine hydrochloride which forms has precipitated. Said amine hydrochloride is then removed by filtration, after which the tetrahydrofuran is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 14.3 grams of 3,3-dichloroallyl N,N-bis(2-chloroethyl)-P-(methyl)phosphonamidate as an amber oil. Analysis shows 43.2% chlorine and 4.3% nitrogen as against calculated values of 43.11% and 4.26%, respectively, for $C_8H_{14}Cl_4NOP$.

Example XXIV

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 12.7 grams (0.1 mol) of 3,3-dichloroallyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 17.0 grams of 3,3-dichloroallyl N,N - bis(2-chloroethyl)-P-(chloromethyl)phosphonamidate as an amber oil. Analysis shows 49.07% chlorine and 3.55% nitrogen as against calculated values of 48.77% and 3.85%, respectively, for $C_8H_{13}Cl_5NO_2P$.

Example XXV

A suitable reaction vessel is charged with a solution of 35.8 grams (0.15 mol) of N,N-bis(2-chloroethyl)-P-(methyl)phosphonamidic chloride in 150 ml. of ether. Said solution is then stirred during the addition of a solution of 15.2 grams (0.15 mol) of triethylamine and 8.7 grams (0.15 mol) of allyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 18.6 grams of allyl N,N-bis(2-chloroethyl) - P - (methyl)phosphonamidate as an amber oil. Analysis shows 27.25% chlorine and 5.57% nitrogen as against calculated values of 27.26% and 5.39%, respectively, for C₈H₁₆Cl₂NOP.

*Example XXVI*

A suitable reaction vessel is charged with a solution of 27.3 grams (0.1 mol) of N,N - bis(2 - chloroethyl)-P-(chloromethyl)phosphonamidic chloride in 150 ml. of ether. Said solution is then stirred during the addition of a solution of 10.1 grams (0.1 mol) of triethylamine and 9.25 grams (0.1 mol) of 3-chloroallyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 11.0 grams of 3 - chloroallyl N,N-bis(2-chloroethyl) - P - (chloromethyl)phosphonamidate as an amber oil. Analysis shows 42.85% chlorine and 4.35% nitrogen as against calculated values of 43.11% and 4.26%, respectively, for C₈H₁₄Cl₄NO₂P.

*Example XXVII*

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 14.95 grams (0.1 mol) of 2,2,2-trichloroethyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 21.8 grams of (2,2-trichloroethyl N,N-bis(2-chlorethyl)-P-(chloromethyl)phosphonamidate as an amber oil. Analysis shows 55.71% chlorine and 3.77% nitrogen as against calculated values of 55.13% and 3.63%, respectively, for C₇H₁₂Cl₆NO₂P.

*Example XXVIII*

A suitable reaction vessel is charged with a solution of 40.95 grams (0.15 mol) of N,N-bis(2-chloroethyl)-P-(chloromethyl)phosphonamidic chloride in 150 ml. of ether. Said solution is then stirred during the addition of a solution of 15.15 grams (0.15 mol) of triethylamine and 8.7 grams (0.15 mol) of allyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 26.6 grams of allyl N,N-bis(2-chloroethyl)-P-(chloromethyl) phosphonamidate as an amber oil. Analysis shows 35.9% chlorine and 4.96% nitrogen as against calculated values of 36.11% and 4.76%, respectively, for

C₈H₁₅Cl₃NOP

*Example XXIX*

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 9.5 grams (0.1 mol) of 3-chloropropyl alcohol in 50 ml. of ether. The temperature of the reaction mixture is maintained at 25–30° C., and the stirring is continued until all of the amine hydrochloride which forms has precipitated. Said amine hydrochloride is the removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. These are obtained 17.2 grams of 3-chloropropyl N,N-bis(2-chloroethyl)-P-(chloromethyl)phosphonamidate as a light yellow liquid. Analysis shows 42.37% chlorine and 4.21% nitrogen as against calculated values of 42.75% and 4.23%, respectively, for C₈H₁₆Cl₄NO₂P.

*Example XXX*

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 12.9 grams (0.1 mol) of 2,3-dichloropropyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 19.7 grams of 2,3-dichloropropyl N,N-bis(2-chloroethyl)-P-(chloromethyl)phosphonamidate as a light yellow liquid. Analysis shows 48.75% chlorine and 3.51% nitrogen as against calculated values of 48.5% and 3.84%, respectively, for C₈H₁₅Cl₅NO₂P.

*Example XXXI*

A suitable reaction vessel is charged with a solution of 20.5 grams (0.075 mol) of N,N-bis(2-chloroethyl)-P-(chloromethyl)phosphonamidic chloride in 150 ml. of ether. Said solution is then stirred during the addition of a solution of 7.5 grams (0.075 mol) of triethylamine and 7.0 grams (0.075 mol) of 2-chloropropyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 10.4 grams of 2-chloropropyl N,N-bis(2-chloroethyl)-P-(chloromethyl)phosphonamidate as a viscous liquid. Analysis shows 42.51% chlorine and 4.18% nitrogen as against calculated values of 42.75% and 4.23%, respectively, for C₈H₁₆Cl₄NO₂P.

*Example XXXII*

A suitable reaction vessel is charged with a solution of 23.7 grams (0.1 mol) of N,N-bis(2-chloroethyl)-P-(methyl)phosphonamidic chloride in 150 ml. of ether. Said solution is then stirred during the addition of a solution of 10.1 grams (0.1 mol) of triethylamine and 12.9 grams (0.1 mol) of 2,3-dichloropropyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 15.6 grams of 2,3-dichloropropyl N,N-bis(2-chloroethyl)-P-(methyl)phosphonamidate as a viscous tan oil. Analysis shows 43.1% chlorine and 3.92% nitrogen as against calculated values of 42.75% and 4.23%, respectively, for $C_8H_{16}Cl_4NO_2P$.

*Example XXXIII*

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 6.0 grams (0.1 mol) of propyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 17.1 grams of propyl N,N-bis(2-chloroethyl)-P-(chloromethyl)phosphonamidate as a light yellow liquid. Analysis shows 35.91% chlorine and 4.73% nitrogen as against calculated values of 35.81% and 4.73%, respectively, for $C_8H_{17}Cl_3NO_2P$.

*Example XXXIV*

A suitable reaction vessel is charged with a solution of 23.7 grams (0.1 mol) of N,N-bis(2-chloroethyl)-P-(methyl)phosphonamidic chloride in 150 ml. of ether. Said solution is then stirred during the addition of a solution of 10.1 grams (0.1 mol) of triethylamine and 14.9 grams (0.1 mol) of 2,2,2-trichloroethyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and then purified by chromatography on a 34 x 350 mm. column of Fisher absorption alumina by elution with a 1:1 hexane-benzene mixture. There are obtained 18.9 grams of 2,2,2-trichloroethyl N,N-bis(2-chloroethyl)-P-(methyl)phosphonamidate as a yellow liquid. Analysis shows 50.31% chlorine and 3.89% nitrogen as against calculated values of 50.45% and 3.99%, respectively, for $C_7H_{13}Cl_5NO_2P$.

*Example XXXV*

A suitable reaction vessel is charged with a solution of 23.7 grams (0.1 mol) of N,N-bis(2-chloroethyl)-P-(methyl)phosphonamidic chloride in 150 ml. of ether. Said solution is then stirred during the addition of a solution of 10.1 grams (0.1 mol) of triethylamine and 9.3 grams (0.1 mol) of 3-chloroallyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 10.1 grams of 3-chloroallyl N,N-bis(2-chloroethyl)-P-(methyl)phosphonamidate as a yellow oil. Analysis shows 36.08% chlorine and 5.05% nitrogen as against calculated values of 36.09% and 4.75%, respectively, for $C_8H_{15}Cl_3NO_2P$.

*Example XXXVI*

A suitable reaction vessel is charged with a solution of 42.7 grams (0.18 mol) of N,N-bis(2-chloroethyl)-P-(methyl)phosphonamidic chloride in 150 ml. of tetrahydrofuran. Said solution is then stirred during the addition of 18.2 grams (0.18 mol) of triethylamine and 10.8 grams (0.18 mol) of propyl alcohol in 50 ml. of tetrahydrofuran. The temperature of the reaction mixture is maintained at 25–30° C., and the stirring is continued until all of the amine hydrochloride which forms has precipitated. Said amine hydrochloride is then removed by filtration, after which the tetrahydrofuran is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 16.7 grams of propyl N,N-bis(2-chloroethyl)-P-(methyl)phosphonamidate as a yellow liquid. Analysis shows 27.31% chlorine and 5.23% nitrogen as against calculated values of 27.02% and 5.34%, respectively, for $C_8H_{18}Cl_2NO_2P$.

*Example XXXVII*

A suitable reaction vessel is charged with a solution of 23.7 grams (0.1 mol) of N,N-bis(2-chloroethyl)-P-(methyl)phosphonamidic chloride in 150 ml. of ether. Said solution is then stirred during the addition of a solution of 10.1 grams (0.1 mol) of triethylamine and 9.4 grams (0.1 mol) of 2-chloropropyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 9.9 grams of 2-chloropropyl N,N-bis(2-chloroethyl)-P-(methyl)-phosphonamidate as a yellow liquid. Analysis shows 35.86% chlorine and 5.01% nitrogen as against calculated values of 35.81% and 4.72%, respectively, for $C_8H_{17}Cl_3NO_2P$.

*Example XXXVIII*

A suitable reaction vessel is charged with a solution of 23.7 grams (0.1 mol) of N,N-bis(2-chloroethyl)-P-(methyl)phosphonamidic chloride in 150 ml. of tetrahydrofuran. Said solution is then stirred during the addition of a solution of 10.1 grams (0.1 mol) of triethylamine and 5.6 grams (0.1 mol) of propargyl alcohol in 50 ml. of tetrahydrofuran. The temperature of the reaction mixture is maintained at 25–30° C., and the stirring is continued until all of the amine hydrochloride which forms has precipitated. Said amine hydrochloride is then removed by filtration, after which the tetrahydrofuran is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 7.5 grams of propargyl N,N-bis(2-chloroethyl)-P-(methyl)phosphonamidate as a yellow oil. Analysis shows 27.28% chlorine and 5.34% nitrogen as against calculated values of 27.44% and 5.43%, respectively, for $C_8H_{14}Cl_2NO_2P$.

*Example XXXIX*

A suitable reaction vessel is charged with a solution of 27.3 grams (0.1 mol) of N,N-bis(2-chloroethyl)-P-(chloromethyl)phosphonamidic chloride in 150 ml. of ether. Said solution is then stirred during the addition of a solution of 10.1 grams (0.1 mol) of triethylamine and 5.6 grams (0.1 mol) of propargyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 14.5 grams of propargyl N,N - bis(2-chloroethyl)-P-chloromethyl)phosphonamidate as an amber liquid. Analysis shows 36.14% chlorine and 4.8% nitrogen as against calculated values of 36.36% and 4.78%, respectively, for $C_8H_{13}Cl_3NO_2P$.

*Example XL*

A suitable reaction vessel is charged with a solution of 23.7 grams (0.1 mol) of N,N-bis(2-chloroethyl)-P-(methyl)phosphonamidic chloride in 150 ml. of ether. Said solution is then stirred during the addition of a solution of 10.1 grams (0.1 mol) of triethylamine and 9.4 grams (0.1 mol) of 3-chloropropyl alcohol in 50 ml. of ether. The temperature of the reaction mixture is maintained at 25–30° C., and the stirring is continued until all of the amine hydrochloride which forms has precipitated. Said amine hydrochloride is then removed by filtration, after which the ether is evaporated. The residue is subjected to a vacuum of 0.1 mm. at 50° C. and is then purified by chromatography on a 34 x 350 mm. column of Fisher absorption alumina by elution with a 1:1 hexane-benzene mixture. There are obtained 15.3 grams of 3-chloropropyl N,N - bis(2 - chloroethyl) - P-(methyl)phosphonamidate as a viscous yellow oil. Analysis shows 35.44% chlorine and 4.55% nitrogen as against calculated values of 35.81% and 4.72%, respectively, for $$C_8H_{17}Cl_3NO_2P$$

It will be noted that when water is reacted with the phosphonamidic halide to produce a phosphonamidic acid (R=hydrogen), the product will generally be isolated as a salt of such an acid (see Examples I and XX). Although the free acid itself can be readily isolated from the filtrate remaining after removal of the amine hydrochloride, said acid tends to decompose upon standing for an extended period. It is therefore preferred to form an amine salt of the acid as shown in the aforesaid examples.

It will be apparent that by employing other and different alcohols and mercaptans of the formula, ROH or RSH, where R has the meaning defined above, other compounds within the scope of this invention can be prepared.

The compounds of this invention have been found to be particularly useful in retarding undesirable cell multiplication. Per se, such compounds are not especially effective alkylating agents since the basic nature of the bis(2-chloroethyl)amino group is diminished by the phosphonamidic bond. However, the P-N bond can be broken by enzymatic hydrolysis to liberate nitrogen mustard, a strong alkylating agent. The hydrolysis is believed to be promoted by the action of phosphonamidase, which has been found to be abundant in the above-mentioned cells.

It will be recognized that the specific embodiments set forth above are presented for the purpose of illustration only. Variations and modifications may be made by those skilled in the art without departure from the spirit and scope of this invention as defined in the appended claims.

The embodiments of the invention in which an exclusive property or privilege is claimed are defined as follows:

1. A compound of the formula,

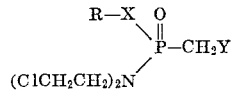

wherein X is selected from the group consisting of oxygen and sulfur, Y is selected from the group consisting of chlorine and hydrogen, and R is selected from the group consisting of hydrogen, alkyl of one to four carbon atoms, mono-, di- and trichloroalkyl of one to four carbon atoms, allyl, mono- and dichloroallyl, propynyl, phenyl, monochlorophenyl, mononitrophenyl, monocyanophenyl, tolyl, and tetrahydrofurfuryl.

2. A compound of the formula,

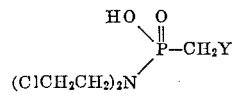

wherein Y is selected from the group consisting of hydrogen and chlorine.

3. A compound of the formula,

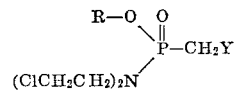

wherein Y is selected from the group consisting of hydrogen and chlorine, and R is monochloroallyl.

4. 2 - chloroallyl N,N - bis(2 - chloroethyl)-P-(chloromethyl)phosphonamidate.

5. 2 - chloroallyl N,N-bis(2-chloroethyl)-P-(methyl)-phosphonamidate.

6. S-propyl N,N-bis(2-chloroethyl)-P-(chloromethyl)-phosphonamidothiolate.

7. S - (p - chlorophenyl) N,N - bis(2 - chloroethyl)-P-(chloromethyl)phosphonamidothiolate.

References Cited by the Examiner
UNITED STATES PATENTS

| | | | |
|---|---|---|---|
| 2,668,838 | 2/1954 | Tolkmith | 260—461 |
| 2,668,840 | 2/1954 | Tolkmith | 260—461 |
| 2,670,369 | 2/1954 | Filatoff-Rocq. et al | 260—261 |
| 2,765,276 | 10/1956 | Van Winkle et al. | 260—461 |
| 2,831,014 | 4/1958 | Sallmann et al. | 260—461 |
| 3,010,986 | 11/1961 | Reetz | 260—461 |

CHARLES B. PARKER, *Primary Examiner.*

MORRIS LIEBMAN, *Examiner.*